May 23, 1933.  A. B. CASPER  1,910,240

SHOCK ABSORBER

Filed April 17, 1930

Inventor
Anthony B. Casper
By Popp & Powers
Attorneys

Patented May 23, 1933

1,910,240

UNITED STATES PATENT OFFICE

ANTHONY B. CASPER, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed April 17, 1930. Serial No. 444,917.

This invention relates more particularly to a shock absorber of the Houdaille type in which a liquid replenishing chamber or reservoir is employed for supplying liquid to the working chambers in whch the pistons operate.

As heretofore constructed a packing was employed around the oscillating shaft of the pistons between the front end of the bearing in which this shaft turned and the front head of the replenishing chamber, which packing was liable to become displaced upon applying the casing of the replenishing chamber to the body of the working chamber.

The casing of the replenishing chamber in this prior construction was also constructed of cast steel which was not only unduly heavy but also expensive and required machining to form part of the stuffing box for receiving the packing between the same and the bearing in which the piston shaft is journaled.

It is the object of this invention to provide improved means for packing the joint between the front end of the piston shaft bearing and the front head of the replenishing chamber and to so construct the casing of the replenishing chamber that the same can be made of sheet metal and thereby serve as part of the stuffing box between the piston shaft bearing and the casing of the replenishing chamber, and around the piston shaft without requiring any machining.

In the accompanying drawing.

In the accompanying description similar characters of reference indicate like parts in both figures of the drawing.

Figure 1:
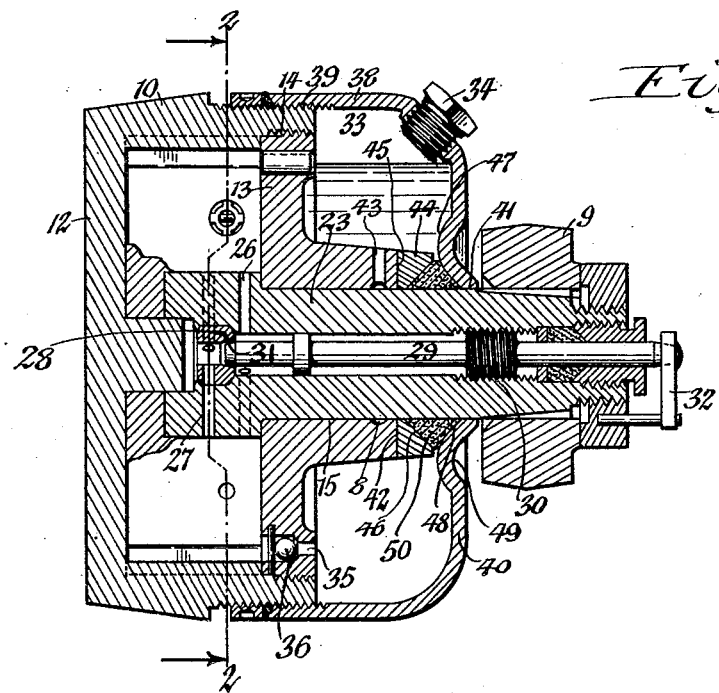
Figure 1 is a vertical longitudinal section of a shock absorber embodying my improvements, taken on line 1—1 Fig. 2.

Although my improvements may be embodied in shock absorbers which may vary in some of the details, that shown in the drawing, as an example of one suitable for receiving my improvements, comprises a body having a cylindrical wall 10 which is adapted to be connected with the frame of the automobile by bolts passing through lugs 11—11 on opposite sides of this wall. At its rear end the space within the wall 10 is closed by a rear head 12 which is preferably formed integral therewith and at its front end this space is closed by a transverse head or wall 13 which is connected with the cylindrical wall 10 by a screw joint 14 and provided centrally with a forwardly projecting bearing 15. The space within the circular wall 10 and the front and rear heads 13 and 12 is divided into two segmental working chambers 16, 17 by a diametrical partition composed of upper and lower sections 18, 19, which working chambers are filled with a resistance liquid such as oil.

Figure 2:
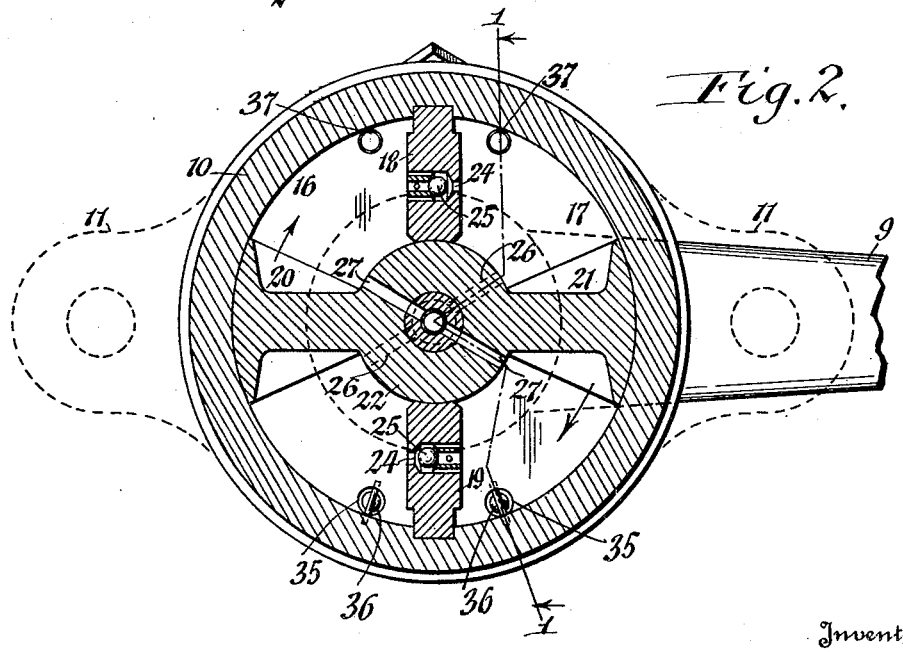
Figure 2 is a transverse section thereof taken on line 2—2 Fig. 1.

Within these working chambers two pistons 20, 21 oscillate back and forth, which pistons are formed on opposite sides of the hub 22 which is preferably connected with the rear end of a piston rock shaft 23 journaled in the bearing 15 and connected externally of the absorber by an operating rock arm 9 or any other suitable means with the axle of the automobile so that when the spring system between the frame and axle of the car is compressed the pistons will be moved backwardly in the working chambers with a low pressure stroke toward the low pressure ends of the working chambers, and when the frame and axle of the car separate during the rebound of the spring system the pistons will be moved toward the high pressure ends of the working chambers, as indicated by the arrows associated with these pistons in Fig. 2.

Each of the partition sections 18 and 19 has a by-pass port 24 which is controlled by a check valve 25 so that during the low pressure stroke of the pistons the resistance liquid can flow from the upper low pressure end of the right working chamber 17 to the high pressure end of the left working chamber 16, and from the low pressure end of the left working chamber 16 to the high pressure end of the right working chamber, but during a reverse movement of the pistons these check valves are closed and prevent the flow of resistance liquid through the partition sections and cause a greater resistance to be offered to the movement of the pistons during the higher pressure strokes of the same than during the low pressure strokes thereof.

Regulation of the liquid resistance to the movement of the pistons is effected by adjustable controlling means which in the present case consist of by-pass or controlling ports 26, 27 formed in the hub of the pistons and leading from opposite sides of the same to points arranged in front and rear of a valve seat 28 within the axis of the hub, and a regulating valve stem 29 adjustable lengthwise in the rock shaft 23 by means of a screw joint 30 between the same, and provided at its rear or inner end with a valve 31 movable toward and from the valve seat 28 and provided at its front end with a handle 32 for adjusting the valve stem and the capacity of the by-pass or controlling ports 26. By adjusting the valve 31 the resistance liquid will flow more or less freely back and forth between the high and low pressure sides of the pistons and thereby enable the capacity of the absorber to be adapted to the load which is being carried.

In front of the working chambers is arranged a replenishing chamber 33 which is adapted to hold a reserve supply of resistance liquid and feed the same to the working chambers as required. This liquid is introduced into the replenishing chamber through an opening in its top which is normally closed by a plug 34 and is delivered to the lower end of one or both of the working chambers through one or more replenishing ports 35 formed in the lower part of the front head or wall 13 and controlled by check valves 36 opening toward the working chambers but closing toward the replenishing chamber.

Any air present in the working chambers is permitted to pass from the upper ends of the same into the upper part of the replenishing chamber by one or more vent ports 37 formed in the upper part of the wall 13 and extending from the upper ends of the working chambers to the upper end of the replenishing chamber.

The replenishing chamber or reservoir is formed between the front head 13 of the body and a sheet metal casing consisting of a peripheral wall 38 which is connected at its rear end by means of a screw joint 39 with the peripheral wall of the body, and a front head or wall 40 connected with the front part of the peripheral wall 38 and provided centrally with an opening 41 through which the front end of the operating rock shaft 23 passes.

The present invention is concerned primarily with the improved means for packing the joint between the front end of the operating rock shaft and the front wall of the reservoir casing so as to simplify the construction, reduce the cost of manufacture and render this joint more efficient in preventing leakage of resistance liquid to the exterior of the instrument. To that end these improvements are constructed as follows:

At its front end the bearing 15 is provided with a flat transverse face 42 which is arranged at a distance from the front head 40 of the replenishing chamber casing, and in rear of this face 42 the bearing 15 is provided with a relief passage 43 extending from an annular groove 8 in the bore of this bearing to the periphery thereof where it opens into the replenishing chamber.

In front of the bearing 15 is arranged a thrust ring 44 which surrounds the shaft 23 and is provided with a transverse flat rear face 45 engaging with the flat front face 42 of this bearing, and on its front side this thrust ring is provided with a conical concave face 46.

The front wall 40 of the replenishing chamber casing is provided around its central opening 41 with an annular bead which is stamped therein so as to produce a convex annular face 47 on the rear side of this head, and the inner part of which forms a concave conical seat 48, and the concave front side of this bead forming an annular groove 49 around the shaft opening 41 therein.

The numeral 50 represents a packing ring of relatively soft material surrounding the shaft 23 and engaging its rear side with the conical face 46 of the thrust collar 44 while its front side engages with the conical face 48 on the front head of the replenishing chamber.

During the operation of the absorber the high pressure to which the resistance liquid is subjected will cause some of it to pass forwardly through the joint between the cooperating surfaces between the periphery of the shaft 23 and the bore of the bearing 15, which liquid is prevented from escaping through the joint between this shaft and the front head of the replenishing chamber by means of the packing ring 50, and instead is diverted into the replenishing chamber through the relief groove 8 and passage 43.

Upon screwing the replenishing chamber casing on to the body of the shock absorber the packing ring 50 is compressed between the head of this casing and the thrust ring 44, and during such rotation this ring turns more or less upon the front end of the bearing 23 thereby preventing the packing ring from being distorted or drawn out of shape but instead retained in the form of a double ended cone so as to operate most effectively in firmly engaging the periphery of the shaft and the conical seats 48 and 46 of the casing and the thrust ring for preventing the passage of any liquid therebetween to the exterior of the instrument.

The annular bead is formed on the front head of the replenishing chamber casing by a stamping operation and not only permits of producing the conical rear face 48 on this head for cooperation with the packing ring without requiring any machining operation on this part of the casing, but it also materially stiffens the central part of the casing head so that the same can be made of thinner material and still effectively resist any outward pressure against the same. The formation of an inwardly extending annular bead on the front head of the replenishing chamber casing also provides additional clearance space on the front side of the same due to the annular channel or groove 49 which permits of applying the hub of the rock arm 9 to the front end of the rock shaft without liability of anything being caught between the rear side of this rock arm and the head 40 of the casing, and also permitting of introducing a tool more readily between these parts for prying off this arm from the shaft whenever disassembling of the same for any reason becomes necessary.

I claim as my invention:

1. A shock absorber comprising a body provided with a working chamber adapted to contain a resistance liquid and having a front wall provided with a forwardly projecting bearing; a piston oscillating in said bearing; a shaft connected with said piston and journaled in said bearing; a sheet metal casing containing a replenishing chamber from which liquid is supplied to the working chamber and forming a peripheral wall connected with said body and a front head provided with a central opening for the passage of said shaft and with an annular bead around said opening, the concave face of which is on the front side of said head and the convex face on the rear side of the same and produces a conical seat around said shaft on the rear side of said head; the front end of said bearing having a flat transverse face, a thrust ring surrounding said shaft and having a flat rear face engaging the flat front face of said bearing and provided on its front end with an annular conical seat; and an annular packing surrounding said shaft and interposed between the conical seats of said thrust ring and said head, respectively.

2. A shock absorber comprising a body provided with a working chamber adapted to contain a resistance liquid and having a front wall provided with a forwardly projecting bearing, a piston in said chamber, a shaft connected with said piston and journaled in said bearing, a sheet metal casing containing a replenishing chamber from which liquid is supplied to the working chamber and forming a peripheral wall connected with said body and having a front head provided with a central opening for the passage of said shaft, a thrust ring surrounding said shaft and engaging against the outer end of said bearing and having its outer end beveled to form a conical seat, the front head of said casing having an annular inward deflection surrounding its shaft receiving opening, the convex inner face of said deflection being entirely within the outer face of said casing and forming a conical seat around said shaft in opposition to the conical seat on said thrust ring, said conical seat and said shaft forming a substantially closed annular space of triangular cross-section, and packing received in said space to be clamped against said conical surfaces and shaft when said casing is secured.

In testimony whereof I hereby affix my signature.

ANTHONY B. CASPER.